(12) United States Patent
Coscarella

(10) Patent No.: US 8,646,314 B2
(45) Date of Patent: Feb. 11, 2014

(54) EXTERNALLY ENGAGING TEST BARRIER

(76) Inventor: Gabe Coscarella, Edmonton (CA)

( * ) Notice: Subject to any disclaimer, the term of this patent is extended or adjusted under 35 U.S.C. 154(b) by 352 days.

(21) Appl. No.: 13/013,738

(22) Filed: Jan. 25, 2011

(65) Prior Publication Data
US 2011/0181039 A1 Jul. 28, 2011

(30) Foreign Application Priority Data

Jan. 25, 2010 (CA) .................................. 2690830

(51) Int. Cl.
*G01M 3/00* (2006.01)

(52) U.S. Cl.
USPC ............... 73/40.5 R; 73/46; 73/49.1; 285/95; 138/90; 138/94; 251/319

(58) Field of Classification Search
USPC ........... 73/40.5 R, 46, 49.1, 49.8; 138/89, 90, 138/94; 285/95, 110, 236, 369, 372, 373, 285/406, 417–419, 420, 421, 917
See application file for complete search history.

(56) References Cited

U.S. PATENT DOCUMENTS

| | | | |
|---|---|---|---|
| 1,933,117 A | 10/1933 | Markle | |
| 2,327,615 A | 8/1943 | Ankarlo | |
| 2,373,242 A | 4/1945 | Glashow | |
| 3,019,819 A | 2/1962 | Ankarlo | |
| 3,154,106 A | 10/1964 | Ver Nooy | |
| 3,442,295 A | 5/1969 | Ver Nooy | |
| 3,635,234 A | 1/1972 | Dawson | |
| 3,654,965 A | 4/1972 | Gramain | |
| 3,815,779 A | 6/1974 | Ludwig | |
| 3,844,585 A | 10/1974 | Sands | |
| 4,040,450 A | 8/1977 | Boundy | |
| 4,329,857 A | 5/1982 | Kittle | |
| 4,429,568 A | 2/1984 | Sullivan | |
| 4,429,907 A * | 2/1984 | Timmons | 285/373 |
| 4,436,310 A | 3/1984 | Sawabe | |
| 4,542,642 A | 9/1985 | Tagliarino | |

(Continued)

FOREIGN PATENT DOCUMENTS

GB 2 216 063 A 10/1989

OTHER PUBLICATIONS

"Palmer's® Rip Plug," © 2008 Palmer's Plastics, <http://www.rip-plug_com/rip_plug_html> [retrieved Oct. 1, 2009], pp. 1-2.

(Continued)

*Primary Examiner* — Herzon E Williams
*Assistant Examiner* — Hoang Nguyen
(74) *Attorney, Agent, or Firm* — Christensen O'Connor Johnson Kindness PLLC

(57) ABSTRACT

An externally engaging test barrier for use in testing hydrostatic pressure in a plumbing system having two abutting plumbing components. The test barrier includes a barrier body having a first face, a second face, and at least one peripheral engagement for engaging an external surface of at least one of the two abutting plumbing components to hold the barrier body in position across an end of at least one of the two abutting plumbing components. The peripheral engagement extends perpendicularly from the first face or the second face. A removable portion of the barrier body is defined by a frangible connection. The peripheral engagement of the barrier body is incapable of sealing the plumbing system during a hydrostatic pressure test, unless used in combination with a pipe coupling that forms an overlying sealing sleeve.

10 Claims, 4 Drawing Sheets

(56) References Cited

U.S. PATENT DOCUMENTS

| | | | |
|---|---|---|---|
| 4,581,801 A * | 4/1986 | Kobuck et al. | 29/890.031 |
| 4,602,504 A * | 7/1986 | Barber | 73/49.8 |
| 4,706,482 A | 11/1987 | Barber | |
| 4,763,510 A | 8/1988 | Palmer | |
| 4,830,214 A | 5/1989 | Curliss | |
| 4,834,825 A | 5/1989 | Adams | |
| 4,848,155 A | 7/1989 | Huber | |
| 4,850,503 A | 7/1989 | Larsson | |
| 4,863,306 A | 9/1989 | Muenzer | |
| 4,902,043 A | 2/1990 | Zillig | |
| 4,936,350 A * | 6/1990 | Huber | 138/90 |
| 4,961,511 A | 10/1990 | Piltz | |
| 5,033,510 A | 7/1991 | Huber | |
| 5,078,429 A | 1/1992 | Braut | |
| 5,106,127 A | 4/1992 | Briet | |
| 5,163,480 A | 11/1992 | Huber | |
| 5,287,730 A * | 2/1994 | Condon | 73/49.8 |
| 5,297,581 A | 3/1994 | Godfrey | |
| 5,353,943 A | 10/1994 | Hayward | |
| 5,507,501 A | 4/1996 | Palmer | |
| 5,624,123 A | 4/1997 | Meyers | |
| 5,711,536 A | 1/1998 | Meyers | |
| 5,740,830 A | 4/1998 | Mankins | |
| 5,826,609 A | 10/1998 | Watts | |
| 6,029,684 A | 2/2000 | Watts | |
| 6,032,515 A | 3/2000 | Huber | |
| 6,035,898 A | 3/2000 | Dominguez | |
| 6,062,262 A | 5/2000 | Tash | |
| 6,082,183 A | 7/2000 | Huber | |
| 6,085,362 A | 7/2000 | Huber | |
| 6,085,363 A | 7/2000 | Huber | |
| 6,234,007 B1 | 5/2001 | Pampinella | |
| 6,267,001 B1 | 7/2001 | Duncan | |
| 6,289,935 B1 | 9/2001 | Tash | |
| 6,390,118 B1 | 5/2002 | Mankins | |
| 6,564,823 B1 | 5/2003 | Mankins | |
| 6,575,475 B1 | 6/2003 | Duncan | |
| 6,588,454 B1 * | 7/2003 | Johnson et al. | 138/90 |
| 6,595,242 B2 | 7/2003 | Duncan | |
| 6,637,464 B1 | 10/2003 | Cornwall | |
| 6,672,139 B2 * | 1/2004 | Pampinella | 73/49.8 |
| 7,021,337 B2 | 4/2006 | Markham | |
| 7,089,964 B1 * | 8/2006 | Collins et al. | 138/90 |
| 7,264,020 B2 * | 9/2007 | Wolk | 138/90 |
| 7,472,912 B2 | 1/2009 | Duncan | |
| 7,665,486 B2 | 2/2010 | Coscarella | |
| 7,731,242 B2 * | 6/2010 | Coscarella | 285/236 |
| 2004/0129327 A1 | 7/2004 | Hooper | |
| 2007/0096465 A1 * | 5/2007 | Hall et al. | 285/342 |
| 2007/0296213 A1 * | 12/2007 | Jones et al. | 285/421 |
| 2009/0039647 A1 * | 2/2009 | Schwarz et al. | 285/80 |

OTHER PUBLICATIONS

"Palmer's® Rip Plug System," © 2008 Palmer's Plastics, <http://www.ripplug.com/rip_testplug_cord.html> [retrieved Sep. 30, 2009], pp. 1-2.

* cited by examiner

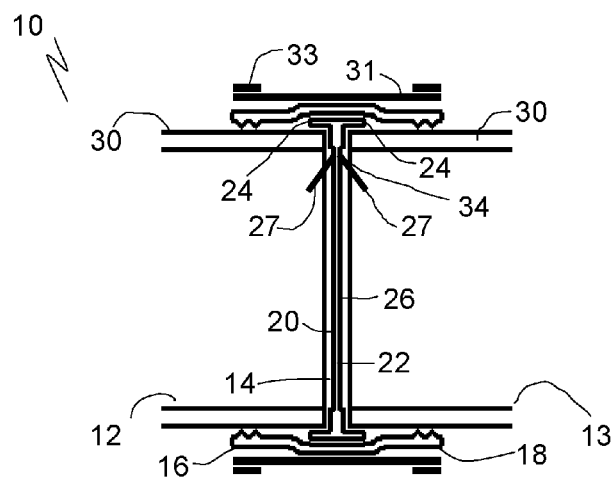
FIG. 5
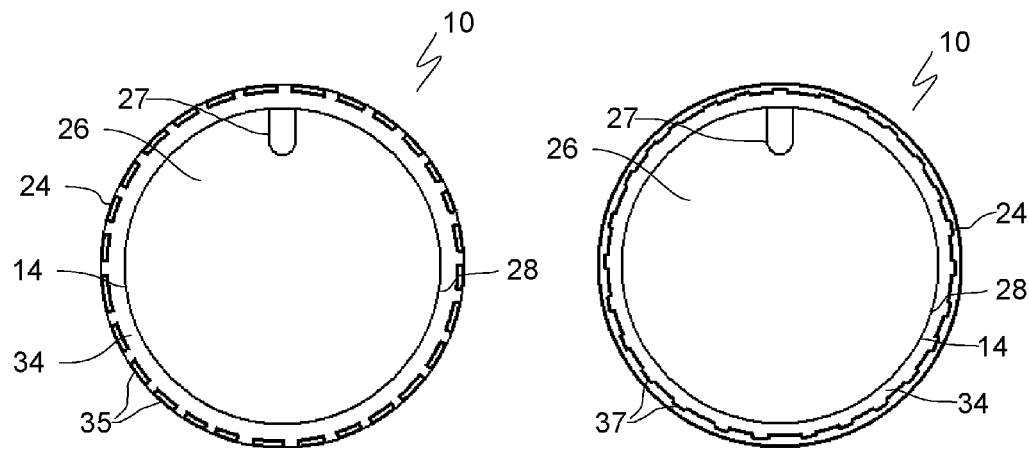
FIG. 6
FIG. 7

EXTERNALLY ENGAGING TEST BARRIER

FIELD

This relates to test barriers that engage the external surface of a pipe for performing hydrostatic tests in a plumbing system.

BACKGROUND

When performing a hydrostatic test of a plumbing system, it is necessary to isolate the plumbing system. U.S. Pat. No. 6,575,475 (Duncan) entitled "Tear-out rubber coupling" describes a coupling capable of holding two section of pipe in end to end relation with a removable barrier formed with a cylindrical section of rubber disposed in between. There are millions of couplings capable of holding two sections of pipe in end to end relation that are sold annually. What is required is a test barrier that is capable of being used with these existing pipe couplings.

SUMMARY

According to one aspect there is provided an externally engaging test barrier for use in testing hydrostatic pressure in a plumbing system comprising two abutting plumbing components. The test barrier includes a barrier body having a first face, a second face, and at least one peripheral engagement for engaging an external surface of at least one of the two abutting plumbing components to hold the barrier body in position across an end of at least one of the two abutting plumbing components. The peripheral engagement extends perpendicularly from the first face or the second face. A removable portion of the barrier body is defined by a frangible connection. The peripheral engagement of the barrier body is incapable of sealing the plumbing system during a hydrostatic pressure test, unless used in combination with a pipe coupling that forms an overlying sealing sleeve.

According to another aspect, there is provided, in combination, an externally engaging test barrier for use in testing hydrostatic pressure in a plumbing system and a coupling. The plumbing system comprises two abutting plumbing components. The externally engaging test barrier comprises a barrier body having a first face, a second face, a peripheral lip extending perpendicularly from at least one of the first face and the second face, and a removable portion disposed within the diameter of the peripheral lip. The removable portion is connected to the barrier body by a frangible connection. The diameter of the peripheral lip is sized to engage an external surface of at least one of the two abutting plumbing components. The coupling comprises a resilient sleeve sized to overlie the peripheral lip of the circular body and engage each of the two abutting plumbing components. The resilient coupling sleeve secures and seals the peripheral lip against the one of the two abutting plumbing components under a predetermined hydrostatic pressure of a hydrostatic pressure test.

According to another aspect, there is provided a two component test barrier assembly for testing hydrostatic pressure, comprising a cap for covering an end of a pipe and a resilient pipe coupling and sealing sleeve. The cap has a body with a peripheral sidewall and an end wall, the end wall having a removable portion connected to a remainder of the body by a frangible connection, with a pull tab secured to the removable portion to facilitate removal by pulling on the pull tab to sever the frangible connection. The resilient pipe coupling and sealing sleeve being size to overlie the cap and having internal sealing means.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 5 is a side elevation view in section of an alternative externally engaging test barrier and coupling installed on a plumbing system.

FIGS. 6 and 7 are top plan views of alternative externally engaging test barriers.

DETAILED DESCRIPTION

Figure 1:
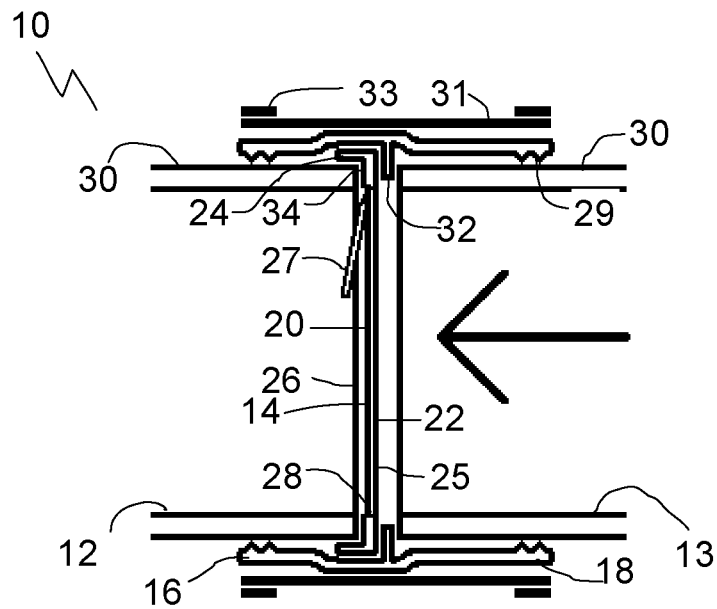
FIG. 1 is a side elevation view in section of an externally engaging test barrier and coupling installed on a plumbing system.

An externally engaging test barrier, generally identified by reference numeral 10 and a coupling, generally identified by reference numeral 16, will now be described with reference to FIGS. 1 through 9.

Structure and Relationship of Parts:

Referring to FIG. 1, externally engaging test barrier 10 is designed for use in testing hydrostatic pressure in a plumbing system that includes two abutting plumbing components 12 and 13. Test barrier 10 is particularly useful with plumbing components that may not have a consistent inner diameter, for example cast iron pipes, which prevents inner sealing elements from being used. Typically, one of plumbing components 12 and 13 will be a fitting that allows access to remove test barrier 10 as will be described below.

Figure 2:
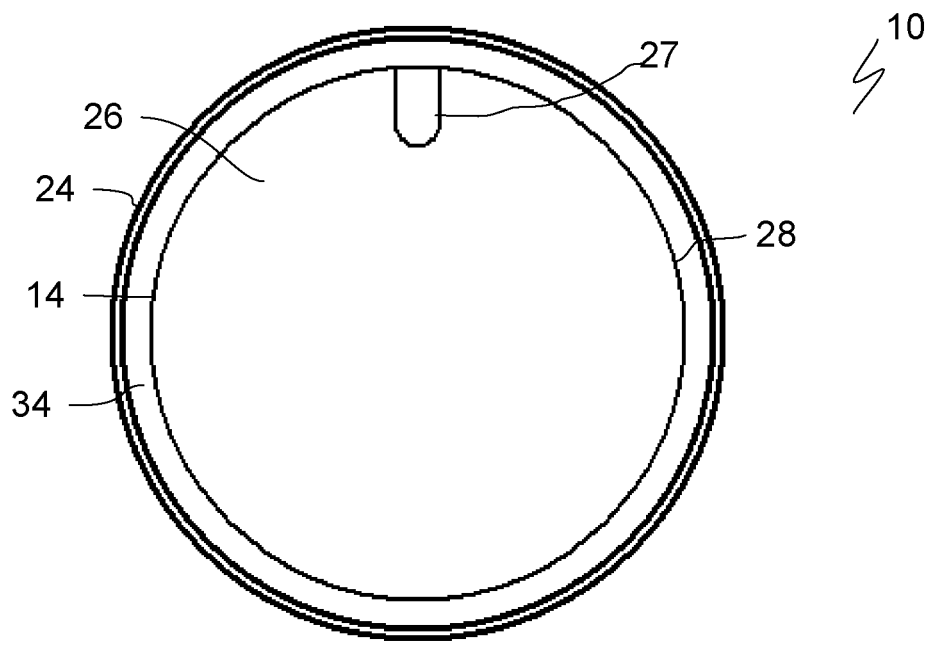
FIG. 2 is a top plan view of an externally engaging test barrier.
Figure 3:
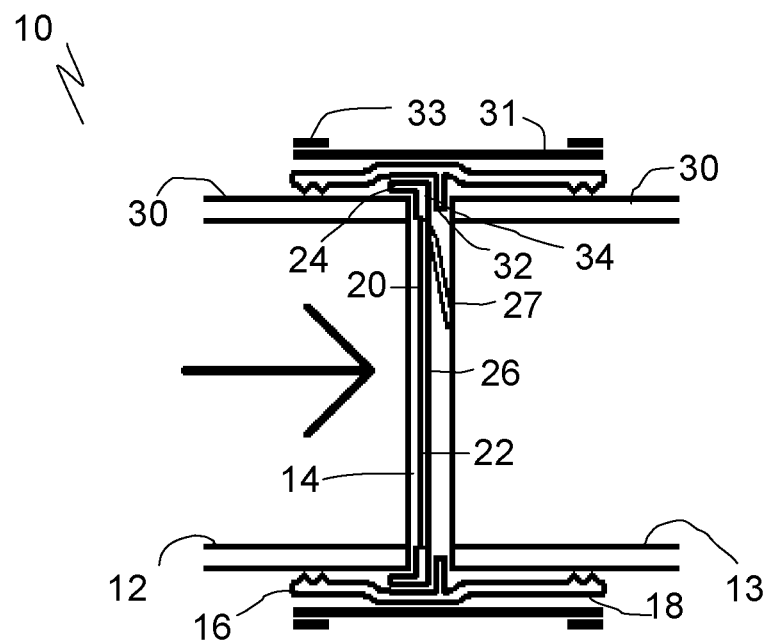
FIG. 3 is a side elevation view in section of an alternative externally engaging test barrier and coupling installed on a plumbing system.
Figure 8:
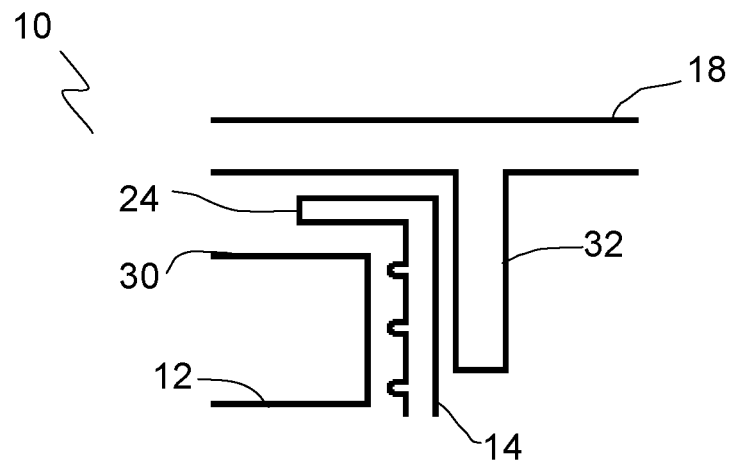
FIGS. 8 and 9 are alternative views of the connection between the coupling, the externally engaging test barrier, and the plumbing system.
Figure 9:
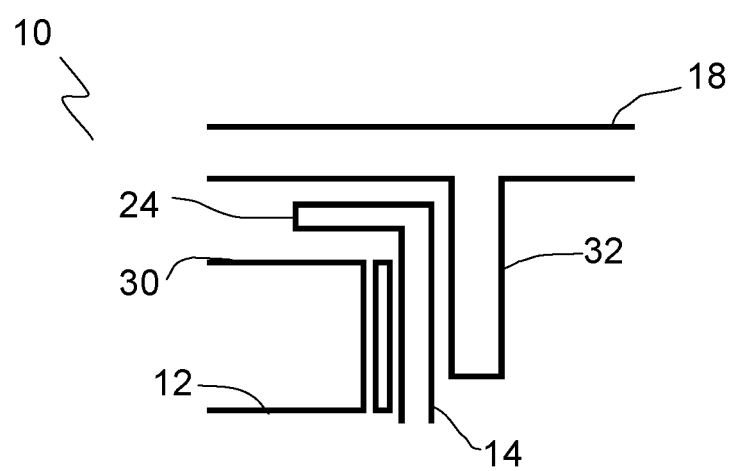

Externally engaging test barrier 10 includes a barrier body 14 and a coupling 16. Barrier body 14 has a first face 20, a second face 22, a peripheral lip 24 which extends perpendicularly from the first face 20 or the second face 22, and a removable portion 26 disposed within the diameter of peripheral lip 24. Referring to FIG. 2, removable portion 26 is connected to barrier body 14 by a frangible connection 28. Referring to FIG. 1 and FIG. 2, the diameter of the peripheral lip 24 is sized to engage an external surface 30 of one of the two abutting plumbing components 12 or 13. As shown, peripheral lip 24 is engaging plumbing component 12. Alternatively, referring to FIG. 5, test barrier 10 may include a peripheral lip 24 extending perpendicularly from each side of barrier body 14, which allows it to engage both plumbing components 12 and 13. Test barrier 10 preferably has an annular sealing surface 34 disposed between the peripheral lip 24 and the removable barrier 26 that engages plumbing component 12 on which it is mounted as shown in FIG. 1, or as shown in FIG. 3, an integral spacer element 32 of a resilient sleeve 18 that is commonly used to couple these types of plumbing components 12 and 13. Resilient sleeve 18 may not have an integral spacer element 32, which would be required if the embodiment shown in FIG. 5 were to be used. The peripheral lip 24 extends perpendicularly on either the same side or the opposite side as the annular sealing surface 34, or both. The type of seal used will depend upon where barrier 10 is installed, and the direction of pressure. Sealing surface 34 may be profiled, such as with a series of ribs 39 as shown in FIG. 8, or may have an additional rubber gasket, either separate or attached to sealing surface 34, as shown in FIG. 9, to enhance its ability to seal against the respective surface. When present, referring to FIG. 4, integral spacer element 32 forms part of a labyrinth seal.

Referring to FIGS. 6 and 7, peripheral lip 24 need not have a solid engagement surface. A shown in FIG. 6, peripheral lip 24 has a series of cutout sections, such that it is made up of a series of teeth 35. Teeth 35 in this design prevent barrier 10 from flexing and being pushed out of the plumbing component 12 or 13 under pressure, as resilient sleeve 18 secures them to plumbing components 12 or 13. Alternatively, referring to FIG. 7, peripheral lip 24 may have a series of intents 37. This design allows for some variation in the outer diameter of plumbing components 12 and/or 13. These variations emphasize the fact that barrier 10 relies on resilient sleeve 18 to form a seal.

Referring to FIG. 1, the rubber coupling 16 is preferably a commercially available coupling, and is made from a resilient sleeve 18 sized to overlie the peripheral lip 24 of the circular body 14 and engage each of the two abutting plumbing components 12 and 13. The resilient sleeve 18 secures and seals the peripheral lip 24 against one of the two abutting plumbing components 12 and 13 under a predetermined hydrostatic pressure of a hydrostatic pressure test. Resilient sleeve 18 may include an integral spacer element 32 that is inserted between the two abutting plumbing components 12 and 13 as shown. As shown in FIG. 3, the peripheral lip 24 engages both the plumbing component 12 under pressure and the plumbing component 13 opposite the pressure. As will be understood, the pressure may also be applied from the plumbing component 13 that peripheral lip 24 does not engage, as shown in FIG. 1. Alternatively, peripheral lip 24 may engage both components 12 and 13, as shown in FIG. 5. Once positioned, rubber coupling 16 is generally secured and sealed in place using a collar 31 and clamps 33 or other known means, as is common in the art.

As shown, frangible connection 28 is a scored line around barrier 10 that has a tab 27. As tab 27 is pulled, the scored line is pulled apart, and the removable portion 26 is pulled away, leaving the peripheral lip 24 and the sealing surface 34. Other designs for frangible connection 28 may be used, such as a spiral section that begins at the center and works outward. Alternatively, there may be a pull tab that rips out a strip along the outside of removable section 26. Other designs will be recognized by those skilled in the art, some of which are described in Canadian Patent Application No. 2,653,473 (Coscarella) entitled "Tear out test plug for plumbing installations." Tab 27 may be positioned on either side of removable portion 26, or both, as shown in FIGS. 1, 3 and 5, respectively.

Barrier 10 is preferably made from a non-elastic material. While an elastic substance would provide a better seal, it makes it more difficult to tear out. Another possibility is to use a rubber material with an embedded wire that cuts the material as it is pulled out. In addition, a non-elastic plastic that is designed to withstand the pressures in a hydrostatic test will be structurally secure on plumbing component 12 against pressures originating from plumbing component 13, as shown in FIG. 1, due to the peripheral lip 24.

Figure 4:
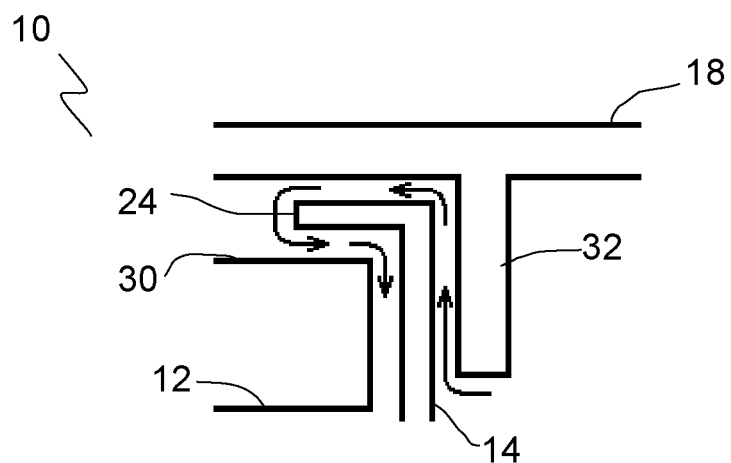
FIG. 4 is a detailed side elevation view in section of the connection between the coupling, the externally engaging test barrier, and the plumbing system.

When installed, barrier 10 does not necessarily seal plumbing component 12 by itself, and may be incapable of withstanding a testing pressure. For example, if pressure is applied in plumbing component 13, fluid would be free to flow as it is not directly engaged by barrier 10. Alternatively, the engagement between lip 24 and plumbing components 12 may be insufficiently strong in isolation to withstand the testing pressure, which is generally in the range of 5-20 psi for water pipes. Rubber coupling 16 is used to ensure this occurs. Referring to FIG. 4, an example of the flow path that must be taken by fluid is shown. As can be seen, there are at least four points at which the flow is restricted between coupling 16, barrier 10, and plumbing component 12. It will be understood that the flow path may be opposite what is shown, depending on whether barrier body 14 is installed on or opposite the plumbing component 12 or 13 being pressurized.

Referring to FIG. 1, another way to describe the present device is to consider it a two component test barrier assembly for testing hydrostatic pressure. There is a cap 14 that covers an end of pipe 12, and a resilient pipe coupling and sealing sleeve 16. Cap 14 has a body with a peripheral sidewall 24 and an end wall 25. End wall 25 has a removable portion 26 connected to a remainder of the body by a frangible connection 28, with a pull tab 27 secured to removable portion 26 to facilitate removal by pulling on pull tab 27 to sever frangible connection 28. Resilient pipe coupling and sealing sleeve 16 is size to overlie cap 14 and has internal sealing means, such as circumferential ridges 29.

Operation:

Referring to FIG. 1, externally engaging test barrier 10 for use in testing hydrostatic pressure in a plumbing system is installed where two abutting plumbing components 12 and 13 are to be hydrostatically tested. A barrier body 14 is placed over one or both of the two plumbing components 12 such that the peripheral lip 24 comes in contact with the external surface 30 of the plumbing component 12 and/or 13. In the depicted example, first face 20 of the barrier body 14 contacts the edge of plumbing component 12 and second face 22 faces the other plumbing component 13. The removable portion 26 is connected to the barrier body 14 by a frangible connection 28 that tears off when tab 27 is pulled, leaving the passageway between plumbing components 12 and 13 unblocked.

Once the test barrier 10 is in place, a coupling 16 is placed over both plumbing components 12 such that an integral spacer element 32 sits between the abutting plumbing components 12 and 13. The coupling 16 is made from a resilient sleeve 18 that overlies the peripheral lip 24 of the barrier body 14 and secures and seals the peripheral lip 24 against plumbing component 12 as shown.

Once the externally engaging test barrier 10 is installed, the plumbing components 12 or 13 may be tested. With resilient coupling 14 installed, the barrier body 14 can withstand pressure from either direction, as shown in FIGS. 1 and 3. Referring to FIG. 1, if the pressure is applied to second face 22 of the barrier body 14, the plumbing component 13 is sealed by coupling 16 and test barrier 10, which may seal itself against the plumbing component 12 by the peripheral lip 24 or a sealing surface 34 at the outer edge of barrier body 14 positioned against the end of plumbing components 12. Referring to FIG. 3, if the pressure is placed on the first face 20 of the barrier body 14, the test barrier 10 seals itself against the integral spacer element 32, against second plumbing component 13 if no spacer element 32 is present, or the seal between the cooperation between first plumbing components 12, peripheral lip 24 and coupling 16 may provide a sufficient seal. Once testing is complete, the removable portion 26 of the barrier body 14 may be ripped out of the plumbing component 12 or 13 at the frangible connection 28. This leaves the plumbing components clear for fluid flow through the pipes.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. In combination:
   an externally engaging test barrier for use in testing hydrostatic pressure in a plumbing system, the plumbing system comprising two abutting plumbing components, the externally engaging test barrier comprising:
   a barrier body having a first face, a second face, at least one peripheral lip extending perpendicularly from at least one of the first face and the second face, and a removable portion of the barrier body defined by a frangible connection;
   the diameter of the peripheral lip being sized to engage an external surface of one of the two abutting plumbing components; and
   a coupling comprising:
   a resilient sleeve sized to overlie the peripheral lip of the barrier body and engage each of the two abutting plumbing components, the resilient coupling sleeve securing and sealing the peripheral lip against the one of the two abutting plumbing components under a predetermined hydrostatic pressure of a hydrostatic pressure test.

2. The combination of claim 1, wherein the coupling is rubber and the externally engaging test barrier is a non-elastic material.

3. The combination of claim 1, wherein the resilient sleeve comprises an integral spacer element for inserting between the two abutting plumbing components.

4. The combination of claim 1, further comprising an annular sealing surface disposed between the peripheral lip and the removable barrier, the annular sealing surface engaging the one of the two abutting plumbing components or an integral spacer element of the resilient sleeve.

5. The combination of claim 4, wherein the peripheral lip extends perpendicularly opposite from the opposite side as the annular sealing surface.

6. The combination of claim 1, wherein the peripheral lip engages the plumbing component under pressure.

7. The combination of claim 1, wherein the peripheral lip engages the plumbing component opposite the plumbing component under pressure.

8. The combination of claim 1, wherein the peripheral lip comprises a broken engagement surface.

9. An externally engaging test barrier for use in testing hydrostatic pressure in a plumbing system, the plumbing system comprising two abutting plumbing components, the externally engaging test barrier comprising:
   a barrier body having a first face, a second face, at least one peripheral engagement for engaging an external surface of at least one of the two abutting plumbing components to hold the barrier body in position across an end of at least one of the two abutting plumbing components, the peripheral engagement extending perpendicularly from the first face or the second face, a removable portion of the barrier body being defined by a frangible connection;
   the peripheral engagement of the barrier body being incapable of sealing the plumbing system during a hydrostatic pressure test unless used in combination with a pipe coupling that forms an overlying sealing sleeve.

10. A two component test barrier assembly for testing hydrostatic pressure, comprising:
    a cap for covering an end of a pipe, the cap having a body with a peripheral sidewall and an end wall, the end wall having a removable portion connected to a remainder of the body by a frangible connection, with a pull tab secured to the removable portion to facilitate removal by pulling on the pull tab to sever the frangible connection; and
    a pipe coupling that is sized to overlie the pipe, wherein the pipe coupling has a circumferential spacer element that forms a portion of a labyrinth seal with the cap.

* * * * *